June 3, 1941. F. O. ALBERTSON Re. 21,814
METAL SPRAY GUN
Original Filed April 30, 1936 2 Sheets-Sheet 1
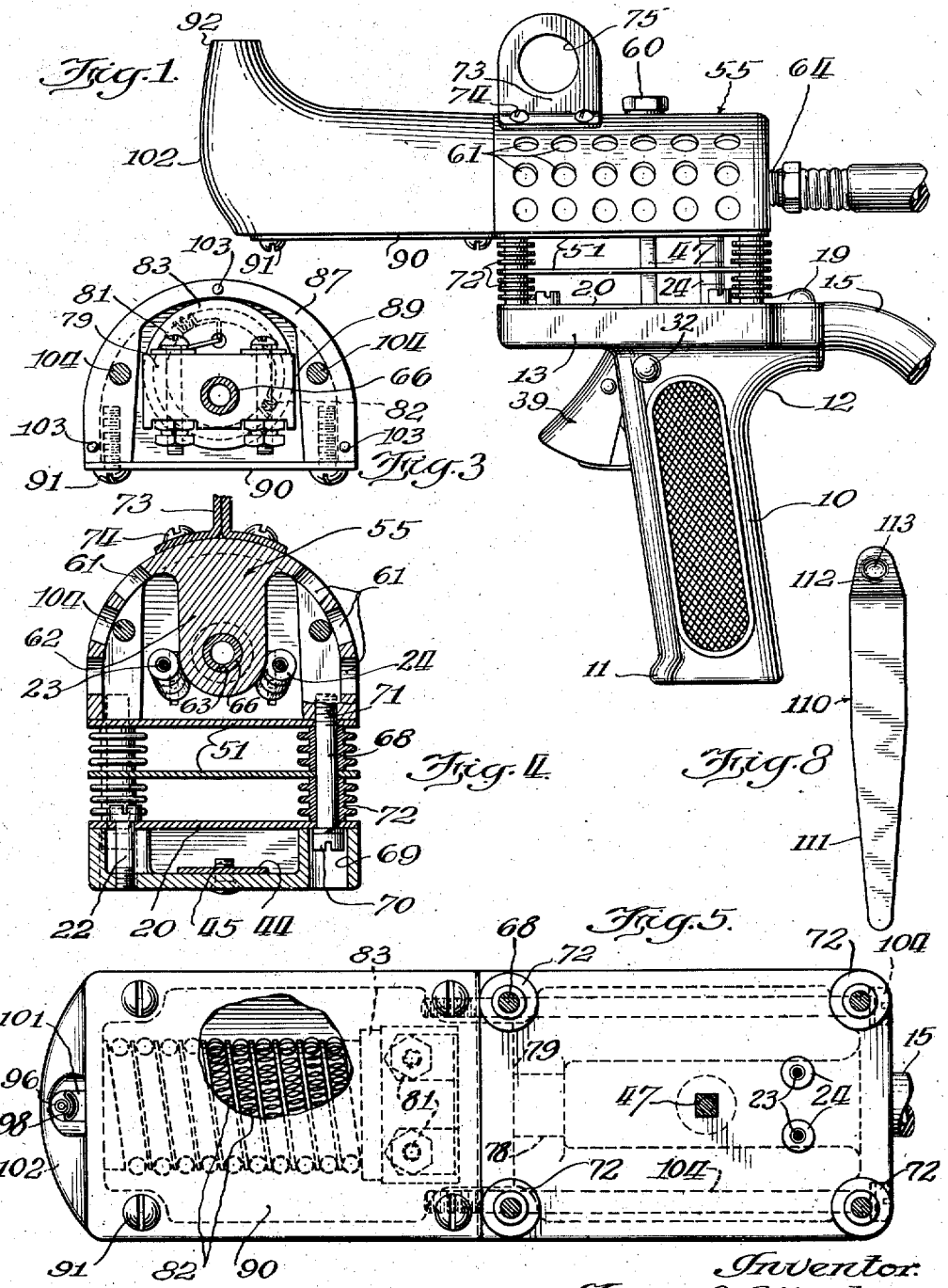
Inventor:
Frans O. Albertson
By Williams, Bradbury & McCaleb & Hinkle
Attys.

June 3, 1941. F. O. ALBERTSON Re. 21,814
METAL SPRAY GUN
Original Filed April 30, 1936 2 Sheets-Sheet 2
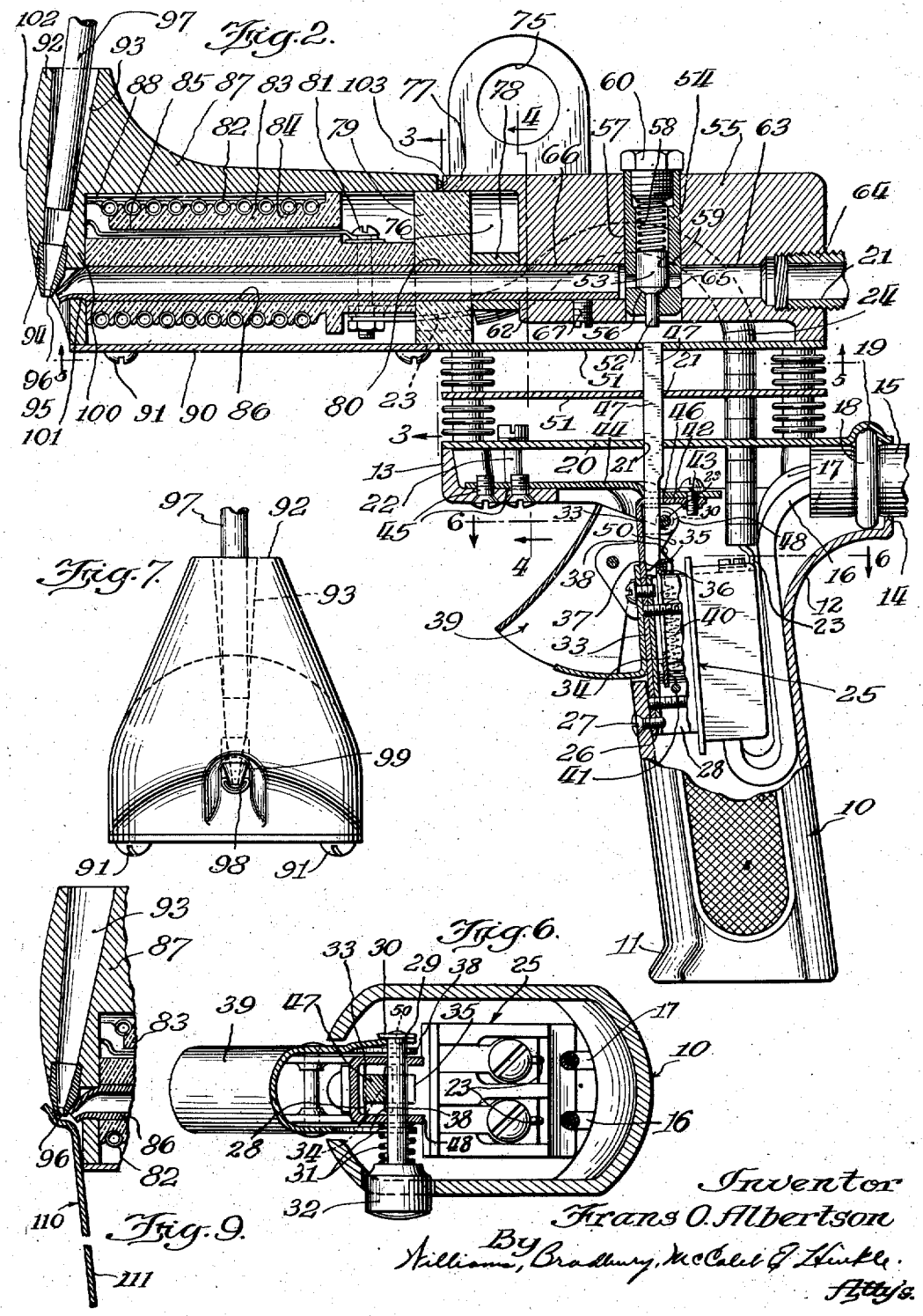
Inventor
Frans O. Albertson
By Williams, Bradbury, McCaleb & Hinkle.
Atty's.

Reissued June 3, 1941

Re. 21,814

UNITED STATES PATENT OFFICE 21,814

METAL SPRAY GUN

Frans O. Albertson, Sioux City, Iowa, assignor to Albertson & Company, Inc., Sioux City, Iowa, a corporation of Iowa Original No. 2,058,653, dated October 27, 1936, Serial No. 77,094, April 30, 1936. Application for reissue November 3, 1937, Serial No. 172,572

28 Claims. (Cl. 91—12.2)

The present invention relates to metal spray guns, and is particularly concerned with devices of the type adapted to spray cold metal upon a prepared metal surface.

It finds its most effective field of use in building up dents and depressions upon the bodies of automotive vehicles without heating the body metal, and in places formerly inaccessible for repair work except by long, tedious hand labor methods.

In straightening fenders and body parts it is not always possible to get the surface entirely smooth. If such a surface is sanded until it is even, certain spots on the metal will be almost sanded through until there is practically no metal left. This condition can now be avoided by applying a thin layer of suitable metal alloy on the spot with a spray gun constructed according to the present invention, and then sanding the area to a smooth and even finish.

One of the objects of the invention is the provision of an improved metal spray gun which has provision for cooling the gun by means of the compressed air used for the spray.

Another object of the invention is the provision of an improved metal spray gun by means of which the metal may be sprayed more effectively by a cold process so that the body of the car is not heated to such an extent that it would warp. The cold spray method is also necessary because some bodies are now insulated with inflammable materials.

Another object of the invention is the provision of an improved metal spray gun having a novel control by means of which both the air and the heat are under the complete control of the operator.

Another object is the provision of an improved nozzle structure for a metal spray gun of the class described, having a particular structure adapted to withstand melting and having a shape which is more effective than the devices of the prior art.

Another object is the provision of an improved metal spray gun utilizing heat for the melting of the metal, which is so constructed that it is more effectively cooled and the handle parts are kept cooler than the devices of the prior art.

Another object of the invention is the provision of an improved metal spray gun in which melted metal is sprayed by compressed air, and in which the air is also heated preliminary to its intermingling with the metal in the spray, so as to prevent chilling of the melted metal by the compressed air.

Another object of the invention is the provision of an improved metal spray gun of the class described, in which the gun body is constructed with parts which are separated from each other to prevent heat transmission except at a plurality of spacing lugs or members which are used to effect the separation.

Another object of the invention is the provision of an improved metal spray gun of the class described, in which the handle is effectively cooled by means of an improved construction and support for the gun body on its handle.

Other objects and advantages of the invention will be apparent from the following description and the accompanying drawings, in which similar characters of reference indicate similar parts throughout the several views.

Referring to the two sheets of drawings:

Fig. 1 is a side elevational view of the metal spray gun constructed according to the present invention;

Fig. 2 is a vertical sectional view taken on a plane passing through the axis of the air tube, with parts of the gun in elevation to show the internal structure;

Fig. 3 is a vertical sectional view, taken on the plane of the line 3—3 of Fig. 2, looking in the direction of the arrows, and showing the end of the heating element housing;

Fig. 4 is a vertical sectional view taken on the plane of the line 4—4 of Fig. 2, looking in the direction of the arrows and showing the details of construction and support of the valve housing on the handle;

Fig. 5 is a bottom plan view of the heating element housing and a sectional view taken through the heat radiating supports on the plane of the line 5—5 of Fig. 2, looking in the direction of the arrows;

Fig. 6 is a horizontal sectional view, taken through the handle and trigger structure, on the plane of the line 6—6 of Fig. 2, looking in the direction of the arrows;

Fig. 7 is a front elevational view of the nose end of the gun;

Fig. 8 is an elevational view of a blow-out and clean-out tool;

Fig. 9 is a fragmentary sectional view, showing the application of the tool for blowing out the metal well.

Referring to Figs. 1 and 2, the handle member 10 may be constructed of cast metal, having any suitable shape for fitting the hand, and of sufficient length down to the finger-engaging shoulder 11, to accommodate the entire hand.

The handle 10 has a rearwardly curved surface 12 adapted to rest on the hand between the thumb and forefinger, and the handle is hollow and provided with a box-like formation 13 of substantially rectangular shape in plan at the top.

The handle has a groove 14 in its rear wall, the groove being of sufficient size to receive the rubber hose 15, which carries insulated electrical conductors 16, 17. Hose 15 has a resilient wire metal ring 18 clamped about it in such manner that it also clamps the walls of the hose into engagement with the conductors 16, 17, and the ring 18 is engaged in a groove 19 formed in the handle cover plate 20.

The cover plate 20 comprises a plate of sheet metal which is formed with a substantially square guide aperture 21 and with other apertures for receiving the screw bolts 22 which secure it on the top of the box-like formation 13. It also has apertures for passing the insulated leads 23 which are covered with short porcelain tubes 24 for insulation.

The handle 10, being hollow, provides a housing for the snap switch unit 25, which may consist of a snap switch of any suitable type. One type of snap switch which may be used is disclosed in Patent No. 1,889,259, issued November 29, 1932.

This switch unit has a threaded bore 26 for reception of a screw bolt 27 passing through the forward wall of the handle and securing the switch unit in place. The switch unit may have secured to it a substantially U-shaped supporting member 28. U-shaped metal member 28 slidably supports a slider 34, which is adapted to engage the tumbler of the snap switch 25 and actuate the snap switch. The slider 34 has a pair of rearwardly projecting flanges 35, 36, the latter one being punched out of the body 34.

Flanges 35, 36 embrace a pin 37, which pin is carried by the rearwardly projecting ears 38 of the trigger 39. The pin 37 is urged downwardly by a pair of coil springs 40, one located on each side of the U-shaped member 28, the ends of each coil spring being hooked over the pin 37. The opposite end of each coil spring is secured by a screw 41 to the U-shaped member 28. The U-shaped member 28 also carries a bracket 33, comprising a strip of metal, also secured by the screw 27 and extending upwardly into the body of the handle 10. This bracket 33 has a rearwardly turned flange 42, which is secured by a screw bolt 43 to a supporting plate 44. Supporting plate 44 is secured in the box-like housing 13 by a pair of screw bolts 45.

Plate 44 and flange 42 both have apertures 46 for passing the square push rod 47. The bracket 33 has a pair of rearwardly projecting flanges 48, with apertures for slidably supporting the plunger 29. Plunger 29 comprises a pin having a washer 30 riveted on one end to retain it in the flanges 48. The other end of the plunger has a knob 32, and a spring 31 is compressed between the knob 32 and a flange 48.

Spring 31 constantly urges the plunger 29 downwardly in Fig. 6 so that washer 30 tends to engage flange 48. The trigger 39, however, has a shoulder 50 so arranged that when the trigger is pulled and the button 32 is pressed, the plunger 29 may engage the shoulder 50 to hold the trigger in closed circuit position.

The trigger is normally in open circuit position, as shown in Fig. 2, and the switch is closed by pulling on the trigger. When the plunger 29 is engaging the shoulder 50 of the trigger, the washer 30 is engaging the side of the flange which forms the shoulder 50 on the trigger, as shown in Fig. 6. This causes the washer 30 to bind against the trigger flange in such manner that plunger 29 constitutes a releasable latch. It is necessary not only to press upon the button 32, but to press on the trigger sufficiently to disengage the trigger from under the washer 30; that is, the trigger must be pulled in far enough so that the shoulder 50 clears the washer 30 before the trigger can then again be released to shut off the switch 25.

It will be evident that the trigger can be held in closed position, and upon release it moves the switch to open position, but it can also be latched in closed position, and can then be released by simultaneously pressing the knob 32, and then pulling and releasing the trigger while the knob is held.

The same trigger 39 also controls an air valve in such manner that both of the sources of power required for operating the spray gun are controlled by the same trigger.

This control is effected through the push rod 47, which extends downwardly through the apertures 46 and 21 and engages the slider 34. The push rod extends upwardly through further guide apertures 21 in the supporting plates 51, and is adapted to engage the stem 52 of an air valve 53.

The air valve 53 is a substantially cylindrical body slidably mounted in a plug 54, which is carried by the metal body 55. Plug 54 may be constructed of brass and provided with a suitable seat 56 for engaging the complementary frusto-conical seat on the valve body 23. The plug 54 may be a close frictional fit in a bore 57 in the body 53.

A coil spring 58 is contained in the bore 59 of plug 54 and engages the valve body 53. The spring is placed under compression by a screw plug 60 which is threaded into the counterbore in the plug 54 and engages the end of the spring. The valve body 53 and seat 56 are so constructed that they have an initial clearance or opening so as to provide for the leakage of air through the spray gun whenever the air is turned on. This is a very important feature for effecting the cooling of the gun and preventing the nose of the gun from getting too hot.

The body 55 is best shown in Fig. 4, and it comprises an inverted trough-shaped cast metal member, the walls of which have a multiplicity of apertures 61. The member 55 has a depending body 62 in the trough, which is adapted to serve as an air conduit, having a bore 63, which may be provided with a counterbore for receiving the air fitting 64.

Conduit 63 communicates with a transverse bore 65 extending through the plug 54, and on the other side of the plug the conduit receives the end of a brass tube 66 for conducting air to a nozzle. The brass tube is secured in the body by means of a set screw 67, which engages the brass tube. The push rod 47 is adapted to engage the end of the valve stem 52 to open the air valve whenever the current is turned on. For this purpose the push rod 47 is suitably spaced from the stem 52 to permit sufficient movement of the trigger 39 to close the switch 25 before the valve is opened. The switch 25 is then first closed by the trigger 39, and continued movement of the trigger 39 serves only to open the air valve 53 to a greater or less amount. A large amount of air or a heavy pressure on the trigger serves to increase the amount of air discharged and to increase the force and volume of the spray. A small amount of metal may be sprayed by merely opening the valve 53 slightly with the trigger 39.

The valve spring 58 also serves to return the push rod 47 to its position, although the push rod is also actuated by gravity. The body 55 is supported upon the handle 10 by means of a plurality of screw bolts 68. The box-like formation 13 has its walls thickened at each corner sufficiently to provide metal for a bore 69 that passes the heads 70 of the screw bolts 68. The heads 70 engage the lower surface of the plate 20, which is secured in place on the box 13 by screw bolts 22. Thus the screw bolts 68 may pass through the plate 20 and be threaded into the bores 71 in the body 55.

Screw bolts 68 also support the heat radiating spacers 72, which are placed on the screw bolts and interposed between the plates 20, 51.

The upper plate 51 serves as a closure for the U-shaped trough members 55, and is also secured in place by screw bolts 68. The member 55 may also be provided with a supporting eye member comprising a pair of sheet metal angle members 73. The feet of these angle members are secured to the top of the body 55 by screw bolts 74 and their upwardly extending flanges are provided with registering apertures 74, 75.

The apertures 75 may be used to engage a hook or other supporting member so that the gun may be hung up when hot or at any other time.

The valve housing 55 has a substantially rectangular opening 76 at its forward or left end in Fig. 2, bounded by the trough-like walls 77. This rectangular opening is adapted to receive the metal spacer 78, which is a tube located on the brass tube 66. It also receives the porcelain spacer 79, which is of sufficient size to fit in the rectangular opening 76 and which has a bore 80 for passing the brass tube 66.

The porcelain spacer 79 also has a pair of transverse apertures in the form of slots for passing the electrical conductors or leads 23 that extend to the terminals 81 of the heating element 82. The heating element 82 comprises a helical coil of nichrome wire or other suitable resistance wire, which is wound helically upon a porcelain spool 83.

The porcelain spool 83 has hemi-cylindrical grooves 84 for receiving the coiled wire 82, and the grooves progress helically on the spool. One end of the heating coil wire is connected directly to a terminal 81 at the right end, while the opposite end of the wire is led through a bore 85 in the spool to the other terminal 81.

The body 83 has a bore 86 formed in it for passing the brass air tube 66, and the heating element is supported by means of this tube. The heating element is housed in a cast metal body 87, which has a substantially trough-like chamber 88 in its interior. This chamber is open at the right end of Fig. 2 and has a substantially rectangular opening at that point for receiving and engaging the flat sides of the spacer 79 as well as the flat sides 89 carried by the end of the porcelain body 83. This prevents rotation of the porcelain body 83 on the tube 66.

The trough-like chamber 88 is closed at the bottom by means of a metal plate 90, which may comprise a name plate of the tool, and is secured in place by screw bolts 91.

At its forward or left end (Fig. 2) the heating element housing is provided with an upwardly extending nose 92, which has a tapered bore 93. The tapered bore extends downwardly and slightly forwardly and terminates in a counterbore 94, which has the bronze nozzle 95 fixedly secured therein by a close frictional or drive fit. The nozzle 95 continues the taper of the bore 93 to a relatively fine nozzle opening 96, which determines the amount of metal sprayed from the gun.

The tapered bore 93 is adapted to receive a stick of suitable solder 97, which is melted by heat of the body 87 generated in the heating coil 82. The brass air tube 66 also terminates in a nozzle 98, the shape of which is shown in Fig. 7. This air tube nozzle opening comprises an arc in shape, and is formed by flattening the end of the tube and curving it. It curves about the tapered frusto-conical end 99 of the air nozzle, when viewed in elevation in Fig. 7. The forward wall 100 of the heater element housing 87 is provided with an aperture 101 for passing the air nozzle tube 66.

The end 102 of the nose of the gun is suitably curved so that it may be used as a trowel for smoothing out the solder after it has been placed and during the placing of the solder. It will be understood that this nose surface 102 is very hot and is adapted to remelt the placed solder, if necessary, in order to smooth it out and place it properly, but the solder is primarily placed by means of the spraying operation.

The edges of the heating element housing 87 where they engage the valve housing 55 are provided at the points 103 with a plurality of small hemi-spherical projections. These projections space these two metal members from each other and substantially reduce the conduction of heat from the member 87 to the member 55. These two members are, however, secured together by elongated screw bolts 104, seen in Fig. 5, the bolts passing through the body 55 and being threaded into the body 87.

The operation of the spray gun is as follows: The gun is first turned on by pulling the trigger 39 and pressing the button 32 in such manner that the trigger is latched in closed circuit position. The gun is permitted to heat up for a period of five minutes. When a metal solder stick, touched to the nose of the gun, is melted, then the gun is hot enough to work. During this time some air will be heard to pass through the gun on account of the initial clearance given the air valve if the air tube is connected at this time. The surface of the metal to be sprayed must be sanded absolutely clean, preferably with a disc sander, and the area sanded should extend to about one inch around the metal fill. All hammering and bumping out of the area should be done before applying the metal. Use of acid or paint remover should be avoided in all cases.

When the surface has been cleaned, a cold tinning compound, suitable for the type of metal cleaned, is used to tin the surface of the metal. Various tinning compounds are on the market and may be used, but I deem it of great importance to use the tinning compounds and methods described in the co-pending application of Frank Osbern Albertson and Gustav A. Olsen, Ser. No. 80,372, filed May 18, 1936, on Method and composition for spraying metal. The tinning compound is applied by wetting a felt base applicator and rubbing the compound into the surface. Then the compound is wiped off to a clean, bright finish by means of a cloth, leaving an amalgam of mercury on the surface. The gun may be properly heated and connected to a source of air pressure of from 55 to 90 pounds per square inch. It is now in condition to be used. Only dry air should be used, and water should be carefully drained from the air line. The metal well in the gun should be kept clean, and if not clean should be cleaned out before spraying. This is done by means of a steel blow-out tool, shown in Fig. 8. This clean-out tool 110 has a tapered body 111, fitting the metal well, and a laterally turned end 112, with a ball-shaped depression 113.

The depression 113 may be disposed in front of the air nozzle, as shown in Fig. 9, to force air from that nozzle up into the metal well to blow it out.

The solder stick is then fed into the well of the heat gun, and as it is melted it is sprayed by means of the compressed air from the nozzle 98. Pressure of the trigger controls the supply of the air, and when the trigger is released both the heat unit and the air are automatically shut off. This avoids damage to the gun. The nose of the gun should not be held too far away from the work, and the best results are accomplished by holding the gun at from one to two inches from the work.

The best way to spray the metal filling is first to spray a thin layer of metal, covering the entire tinned surface. The spray should be moved in circular motion around the outer edge and toward the center. The air should be kept on all the time while feeding metal to the gun. This tends to prevent blowing a blotch of molten metal on the job, and if a blotch occurs it should be removed. When more than one place is to be repaired, the places should be tinned and sprayed one at a time. The spray dust resulting from one job and covering the second prepared surface should be wiped off before tinning the second place.

The metal filling should be sanded down to a feather edge, and in placing the metal it should be built up to such a depth that it can be sanded down to a smooth surface. It is better to use sufficient metal so that it is not necessary to try to add metal after the surface has been once polished. The metal adheres better when it is all applied in one job, and it is difficult to get sprayed metal to adhere to metal which has been polished.

This can now be done, however, by means of smoothing the lead surface and making two or more thorough applications of the tinning compound to the lead surface and immediately spraying metal on it as described in said copending application.

The gun should be carefully cleaned, particularly at the metal well, while it is hot, and the nozzle should be blown out at that time, after all metal has been removed from the well.

The present metal spray gun is adapted to be used to carry out an improved method of repair of automotive fenders and bodies. The present gun has a more effective control than any of the spray guns of any type of the prior art, and both the air and heat are controlled by the trigger. The metal sprayed by this gun is so cool that it may be directly sprayed upon anything without heating the body to which the spray is applied. Thus the panels of metal composing the vehicle body are not heated and warped, and there is no danger of igniting inflammable material used under the metal body for insulation.

The present gun is kept cool by means of its improved structure and by means of the valve clearance which utilizes the air pressure to effect a cooling. It is also adapted to be used for a long period of time without overheating or damage to any of its parts.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by United States Letters Patent is:

1. In a metal spray gun, the combination of an electric heating element with a body having a metal well with a discharge aperture, an air nozzle for spraying molten metal discharged through said aperture, electric switch means for controlling the supply of electric current to said heating element, valve means for controlling the supply of air to said air nozzle, and common controlling means whereby the air supply and the heat of the element are both controlled from the same manual means, said air valve having an initial clearance permitting the leakage of air through said gun and nozzle to effect a cooling of said gun.

2. In a metal spray gun, the combination of an electric heating element with a body having a metal well with a discharge aperture, an air nozzle for spraying molten metal discharged through said aperture, electric switch means for controlling the supply of electric current to said heating element, valve means for controlling the supply of air to said air nozzle, and common controlling means whereby the air supply and the heat of the element are both controlled from the same manual means, said common controlling means being arranged in such manner that the initial movement of said controlling means closes the electric circuit and further movement of said controlling means controls the opening of said air valve.

3. In a metal spray gun, the combination of an electric heating element with a body having a metal well with a discharge aperture, an air nozzle for spraying molten metal discharged through said aperture, electric switch means for controlling the supply of electric current to said heating element, valve means for controlling the supply of air to said air nozzle, common controlling means whereby the air supply and the heat of the element are both controlled from the same manual means, and means for latching said common controlling means with the switch in closed position to heat up the gun.

4. In a metal spray gun, the combination of an electric heating element with a body having a metal well with a discharge aperture, an air nozzle for spraying molten metal discharged through said aperture, electric switch means for controlling the supply of electric current to said heating element, valve means for controlling the supply of air to said air nozzle, common controlling means whereby the air supply and the heat of the element are both controlled from the same manual means, said common controlling means being arranged in such manner that the initial movement of said controlling means closes the electric circuit and further movement of said controlling means controls the opening of said air valve, and means for latching said common controlling means with the switch in closed position to heat up the gun.

5. In a metal spray gun, the combination of a supporting handle with a plurality of posts for supporting a gun body, said posts supporting said gun body in spaced relation to said handle, a gun body comprising means for housing an air valve, and means for housing an electric heating element, said latter means being constructed of heat conducting metal and being provided with a metal well whereby a supply of metal inserted in said well is melted to be sprayed from said gun.

6. In a metal spray gun, the combination of a supporting handle with a plurality of posts for supporting a gun body, said posts supporting said gun body in spaced relation to said handle, a gun body comprising means for housing an air valve, and means for housing an electric heating element, said latter means being constructed of heat conducting metal and being provided with a metal well whereby a supply of metal inserted in said well is melted to be sprayed from said gun, and said metal well having a metal nozzle constructed of metal having a high melting point.

7. In a metal spray gun, the combination of a supporting handle with a plurality of posts for supporting a gun body, said posts supporting said gun body in spaced relation to said handle, a gun body comprising means for housing an electric heating element, said latter means being constructed of heat conducting metal and being provided with a metal well whereby a supply of metal inserted in said well is melted to be sprayed from said gun, said metal well having a metal nozzle constructed of metal having a high melting point, and an air tube controlled by said valve and extending through said gun body and having a nozzle disposed in proximity to said well nozzle.

8. In a metal spray gun, the combination of a supporting handle with a plurality of posts for supporting a gun body, said posts supporting said gun body in spaced relation to said handle, a gun body comprising means for housing an air valve, means for housing an electric heating element, said latter means being constructed of heat conducting metal and being provided with a metal well whereby a supply of metal inserted in said well is melted to be sprayed from said gun, said metal well having a metal nozzle constructed of metal having a high melting point, an air tube controlled by said valve and extending through said gun body and having a nozzle disposed in proximity to said well nozzle, and common controlling means carried by said handle for controlling the opening of said valve and the connection of said heating element to a source of electric power.

9. In a metal spray gun, the combination of a heat conducting body formed with a downwardly tapering metal well, said well communicating with a counterbore and a bronze metal nozzle located in said counterbore, said body having a substantially trough shaped chamber in its lower side provided with a closure plate and a porcelain support located in said chamber and a heating element on said support, said porcelain support and said chamber having complementary engaging shoulders to prevent rotation of said porcelain support in said chamber.

10. In a metal spray gun, the combination of a heat conducting body formed with a downwardly tapering metal well, said metal well communicating with a counterbore and a bronze metal nozzle located in said counterbore, said body having a substantially trough shaped chamber in its lower side provided with a closure plate, a porcelain support located in said chamber, a heating element on said support, said porcelain support and said chamber having complementary engaging shoulders to prevent rotation of said porcelain support in said chamber, a second metal body fixedly secured to said first metal body and carrying the first metal body, and means between said metal bodies for spacing them from each other to reduce the heat conduction between said metal bodies.

11. In a metal spray gun, the combination of a heat conducting body formed with a downwardly tapering metal well, said metal well communicating with a counterbore and a bronze metal nozzle located in said counterbore, said body having a substantially trough shaped chamber in its lower side provided with a closure plate, a porcelain support located in said chamber, a heating element on said support, said porcelain support and said chamber having complementary engaging shoulders to prevent rotation of said porcelain support in said chamber, a second metal body fixedly secured to said first metal body and carrying the first metal body, means between said metal bodies for spacing them from each other to reduce the heat conduction between said metal bodies, said second metal body having an air tube fixedly carried thereby, said air tube extending through said porcelain support and carrying the porcelain support, and a nozzle carried by said metal tube adjacent said well nozzle to effect a spray of metal discharging from said well nozzle.

12. In a metal spray gun, the combination of a heat conducting body formed with a downwardly tapering metal well, said metal well communicating with a counterbore and a bronze metal nozzle located in said counterbore, said body having a substantially trough shaped chamber in its lower side provided with a closure plate, a porcelain support located in said chamber, a heating element on said support, said porcelain support and said chamber having complementary engaging shoulders to prevent rotation of said porcelain support in said chamber, a second metal body fixedly secured to said first metal body and carrying the first metal body, means between said metal bodies for spacing them from each other to reduce the heat conduction between said metal bodies, valve means for controlling the flow of air through said metal tube, and electric switch means for controlling the connection of the source of heat supplied to said element.

13. In a metal spray gun, the combination of a heat conducting body formed with a downwardly tapering metal well, said metal well communicating with a counterbore and a bronze metal nozzle located in said counterbore, said body having a substantially trough shaped chamber in its lower side provided with a closure plate, a porcelain support located in said chamber, a heating element on said support, said porcelain support and said chamber having complementary engaging shoulders to prevent rotation of said porcelain support in said chamber, a second metal body fixedly secured to said first metal body and carrying the first metal body, means between said metal bodies for spacing them from each other to reduce the heat conduction between said metal bodies, said second metal body having an air tube fixedly carried thereby, said air tube extending through said porcelain support and carrying the porcelain support, a nozzle carried by said metal tube adjacent said well nozzle to effect a spray of metal discharging from said well nozzle, and a common trigger for controlling both said valve means and said electric switch means.

14. In a metal spray gun, the combination of a heat conducting body formed with a downwardly tapering metal well, said metal well communicating with a counterbore and a bronze metal nozzle located in said counterbore, said body having a substantially trough shaped chamber in its lower side provided with a closure plate, a porcelain support located in said chamber, a heating element on said support, said porcelain support and said chamber having complementary engaging shoulders to prevent rotation of said porcelain support in said chamber, a second metal body fixedly secured to said first metal body and carrying the first metal body, means between said metal bodies for spacing them from each other to reduce the heat conduction between said metal bodies, said second metal body having an air tube fixedly carried thereby, said air tube extending through said porcelain support and carrying the porcelain support, a nozzle carried by said metal tube adjacent said well nozzle to effect a spray of metal discharging from said well nozzle, a common trigger for controlling both said valve means and said electric switch means, and latching means for latching said trigger in closed circuit position.

15. In a metal spray gun, the combination of a handle with a gun body, said body comprising an elongated metal member having an operating nose at one end provided with a downwardly tapered metal well, a tubular extension for said metal well and having a metal discharging opening, said body being formed with a heater chamber, an electric heating element in said chamber for heating said body and the metal inserted in said well, and an air supply tube carried by said body and extending into said body in proximity to said heating element whereby the air in said tube is also heated by said heating element, and an air nozzle carried by said air tube in position to discharge air across the end of said metal well, to effect a metal spray by means of heated air.

16. In a metal spray gun, the combination of a handle with a gun body, said body comprising an elongated metal member which is provided with a downwardly extending and tapered metal well at one end, said body being supported on said handle at its opposite end and comprising a pair of separate metal parts, means for securing said metal parts together, and means for spacing said metal parts from each other for the purpose of diminishing heat transmission by conduction from one part of said body to the other, said body having a chamber for receiving an electric heating element and having an air supply tube provided with a nozzle disposed to cause a discharge of air across the end of said metal well.

17. In a metal spray gun, the combination of a handle with a gun body, said body comprising an elongated metal member which is provided with a downwardly extending and tapered metal well at one end, said body being supported on said handle at its opposite end and comprising a pair of separate metal parts, means for securing said metal parts together, and means for spacing said metal parts from each other for the purpose of diminishing heat transmission by conduction from one part of said body to the other, said body having a chamber for receiving an electric heating element and having an air supply tube provided with a nozzle disposed to cause a discharge of air across the end of said metal well, said air tube being constructed of metal and passing through a part of said gun body in proximity to said heating element whereby the air is adapted to be heated and the metal sprayed with preheated air.

18. In a metal spray gun, the combination of a handle with a gun body, said body comprising an elongated metal member which is provided with a downwardly extending and tapered metal well at one end, said body being supported on said handle at its opposite end and comprising a pair of separate metal parts, means for securing said metal parts together, and means for spacing said metal parts from each other for the purpose of diminishing heat transmission by conduction from one part of said body to the other, said body having a chamber for receiving an electric heating element and having an air supply tube provided with a nozzle disposed to cause a discharge of air across the end of said metal well, said handle being connected to said body by a plurality of posts for diminishing the heat conduction to said handle from said body, and means carried by said posts for spacing said body from said handle.

19. In a metal spray gun, the combination of a handle with a gun body, said body comprising an elongated metal member which is provided with a downwardly extending and tapered metal well at one end, said body being supported on said handle at its opposite end and comprising a pair of separate metal parts, means for securing said metal parts together, and means for spacing said metal parts from each other for the purpose of diminishing heat transmission by conduction from one part of said body to the other, said body having a chamber for receiving an electric heating element and having an air supply tube provided with a nozzle disposed to cause a discharge of air across the end of said metal well, said handle being connected to said body by a plurality of posts for diminishing the heat conduction to said handle from said body, and means carried by said posts for spacing said body from said handle, and a plurality of heat radiating members carried by said posts, said heat radiating members being arranged for the circulation of air between said heat radiating members.

20. In a metal spray gun, the combination of a supporting handle with a spray gun body, comprising a pair of metal members, one of said metal members being provided with a metal well extending downwardly into said body, and also having an air nozzle adapted to discharge air transversely to the end of said well, said members comprising said gun body being secured together in spaced relation, with spacing means between them to diminish heat conduction between said bodies, and the other of said metal bodies being provided with ventilation openings for permitting the circulation of cooling air through the other of said metal bodies.

21. A gun for spraying metal, comprising a body having therein a heating element and a receiving space for the metal to be sprayed, said space being disposed operatively adjacent the heating element and having a discharge orifice for the melted metal, means to project spraying-fluid relative to the discharge orifice in a manner to spray metal therefrom, a handle, and means interposed between one end of the handle and an adjacent surface of the body, including a plate, each major face of which is generally spaced from the adjacent surfaces of the handle and body respectively a short distance to provide for free passage of air across said surfaces and the faces of the plate, and means to secure the plate, handle and body together substantially in fixed relationship.

22. A gun for spraying metal, comprising a main supporting frame including a laterally projecting handle, a heater housing supported on one end of the frame closely adjacent and in spaced relation thereto to provide a heat-insulation air-gap, a heating element in said housing, a receptacle for metal to be melted and sprayed also located in said housing adjacent the element and having a discharge nozzle which is directed downwardly in the operating position of the gun, and means carried on the frame for conveying fluid and projecting the same generally horizontally and across said discharge nozzle in a manner to spray the metal therefrom.

23. In a gun for spraying metal, a metal-heating assembly including a receptacle for metal having a discharge orifice, a metal housing in which said receptacle is formed, an electric heating element in the housing, means to supply current to the element, and a spraying-fluid conveyor tube located in a through bore of the housing but generally out of contact with the metal of the housing and having a discharge nozzle effect at one end of the bore in spraying relationship to the discharge orifice of the receptacle.

24. In a gun for spraying metal, a metal housing having a heating element therein and a substantially vertical well formed in the housing operatively adjacent the element for receiving the metal to be sprayed and passing the melted metal downwardly therefrom, a tubular tip of non-erodible metal secured in the housing in alignment with the well and projecting free from the metal of the housing, and means to project spraying fluid around and across the orifice of the tip to entrain and spray the metal from the tip.

25. In a gun for spraying metal, a metal housing having a heating element therein and a well formed in the housing adjacent the element for containing the metal to be sprayed, a tubular tip of non-corrosive metal secured in the housing in alignment with the well and projecting free from the metal of the housing, and means including a nozzle having a crescent-shaped orifice for spraying fluid in the form of a trough around and across the orifice of the tip to entrain and spray the melted metal from the tip.

26. In a gun for spraying metal, a metal body having an electric heating element therein and having a metal well formed in the body adjacent said heating element for containing the metal to be sprayed, a tubular tip of metal of higher melting point than the body secured in said body in alignment with said well and projecting free of the metal of the body, and means including a nozzle having an arc-shaped orifice for spraying fluid in the form of a trough around and across the metal discharging from the orifice of the tip to entrain and spray the melted metal issuing from the tip.

27. In a gun for spraying metal, a metal heating assembly including a metal body having a receptacle formed therein for metal, said receptacle having a discharge orifice, an electric heating element located in the body, means to supply current to said element, and a spraying fluid conveyor tube located in a bore in said body and projecting therefrom and having a discharge nozzle located at one end of said tube in spraying relationship to the discharge orifice of the receptacle.

28. In a metal spray gun, the combination of a metal handle with a metal gun body, said gun body comprising an elongated metal member which is provided with a downwardly extending and tapered metal well at one end, having a discharge aperture, said body and handle being connected together by a plurality of supporting posts, a plurality of metal heat radiating plates carried by said posts in spaced relation to each other for diminishing heat transmission from said body to said handle, an electric heating element in said body, and an air supply conduit in said body, said conduit terminating in a tubular metal member projecting from said body in proximity to the discharge aperture of said metal well and having a nozzle disposed to cause a discharge of air across the end of said metal well.

FRANS O. ALBERTSON.